(No Model.)

M. R. JENKINS.
HAY RAKE.

No. 438,316. Patented Oct. 14, 1890.

Witnesses:
W. P. Taylor
W. P. Prather

Inventor:
M. R. Jenkins

UNITED STATES PATENT OFFICE.

MARION R. JENKINS, OF BROWNING, MISSOURI.

HAY-RAKE.

SPECIFICATION forming part of Letters Patent No. 438,316, dated October 14, 1890.

Application filed September 19, 1889. Serial No. 324,458. (No model.)

*To all whom it may concern:*

Be it known that I, MARION R. JENKINS, residing at Browning, in the county of Linn and State of Missouri, and a citizen of the United States, have invented a new and useful Improvement in Hay-Rakes, of which the following is a specification, reference being had to the accompanying drawings, in which—

Figure 1:
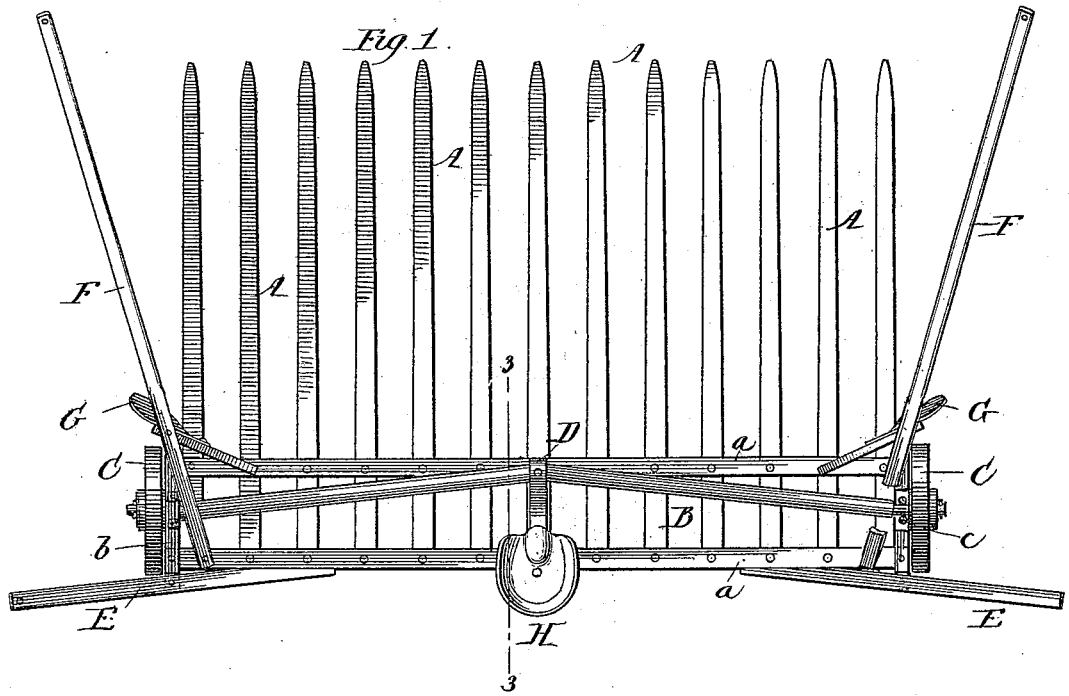
Figure 2:
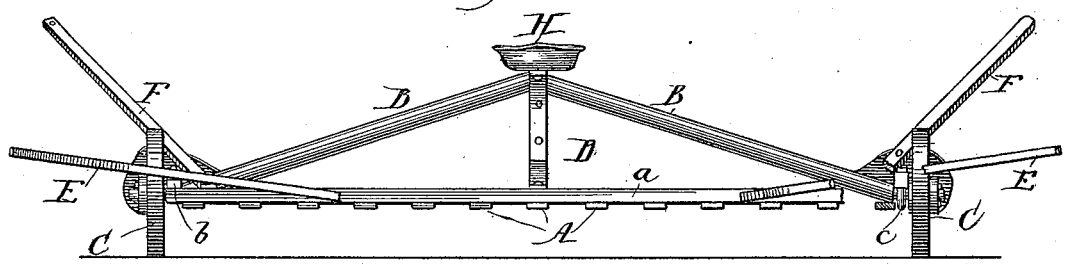
Figure 3:
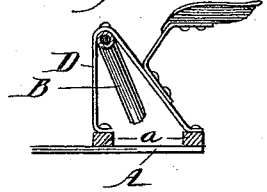

Figure 1 is a top or plan view. Fig. 2 is a rear elevation. Fig. 3 is a vertical section at line 3 3 of Fig. 1. Some of the parts are broken out on the right-hand side of Figs. 1 and 2 to show the manner of securing the axle to the rake-head.
This invention relates to that class of hay-rakes which are employed in connection with hay-stackers, and in which the horses are hitched at the end of the rake.

As heretofore constructed the rake-heads of this class of rakes have been liable to become loose and to sag or give down under the weight of the load from the continual jolting in passing over rough ground. Such sagging and loosening of the rake-head permits the points of the rake-teeth to get out of line and to spring apart, causing the teeth to catch in the ground and the rake to do poor work.

The object of this invention is to improve the construction of the rake so as to avoid the above-mentioned objection, as well as to improve its construction generally, which I accomplish as illustrated in the drawings, and as hereinafter described. That which I claim as new will be pointed out in the claims.
In the drawings, A represents the rake-teeth, which are secured at their rear ends to two cross-bars *a a*, which form the rake-head. The cross-bars *a* are secured together by the teeth A on their under sides and by short pieces *b* on their upper sides, as shown in Figs. 1 and 2.

B represents an arch, which, as here shown, constitutes the axle, and preferably made of gas-pipe. It is secured to the rake-head by a stirrup *c* at each end or by other suitable means, and the wheels C are mounted upon each end of it, or upon spindles secured to each end.

D represents a brace secured to the cross-bars *a* and to the arch B, as shown in Fig. 3.

E represents the draft-bars.

F represents the backing-poles.

G represents the fenders.

H represents the seat, which is secured to the brace D.

The arch B relieves the rake-head of the weight of the load, and the draft-bars E and backing-poles F are secured to the rake-head in such position that the strain of the draft-bars and backing-poles will be resisted by the arch B, which, as shown, is braced forward by the brace D. The wheels C being mounted upon the arch, the rake-head is less liable to be loosened by the jolting of the wheels in passing over uneven ground, and the wheels may be made larger, which will reduce the draft as well as the jolting. The backing-poles F are secured to the cross-bars *a*, as shown, thereby bracing the rake-head and tending to keep it square. The rake-head may be made much lighter, and yet will be much stronger on account of the arch B relieving it of the weight and strain of the rake. The brace D holds the arch B firmly in position, supports the center of the rake-head, and also furnishes a convenient and elastic support for the seat H.

What I claim as new, and desire to secure by Letters Patent, is—

The combination, with a rake-head carrying rake-teeth, of the forwardly-inclined arch secured at both ends to the rake-head, a brace between the arch and rake-head, and draft-bars at the ends of the rake-head, substantially as described.

MARION R. JENKINS.

Witnesses:
R. L. GIBSON,
M. L. GIBSON.